(12) United States Patent
Neven et al.

(10) Patent No.: US 12,676,739 B2
(45) Date of Patent: *Jul. 7, 2026

(54) QUANTUM NEURAL NETWORK

(71) Applicant: Google LLC, Mountain View, CA (US)

(72) Inventors: Hartmut Neven, Malibu, CA (US);
Edward Henry Farhi, Venice, CA
(US)

(73) Assignee: Google LLC, Mountain View, CA (US)

( * ) Notice: Subject to any disclaimer, the term of this
patent is extended or adjusted under 35
U.S.C. 154(b) by 96 days.

This patent is subject to a terminal dis-
claimer.

(21) Appl. No.: 18/431,009

(22) Filed: Feb. 2, 2024

(65) Prior Publication Data

US 2025/0240154 A1     Jul. 24, 2025

Related U.S. Application Data

(63) Continuation of application No. 18/117,232, filed on
Mar. 3, 2023, now Pat. No. 11,924,334, which is a
(Continued)

(51) Int. Cl.
H04L 9/08          (2006.01)
B82Y 10/00          (2011.01)
(Continued)

(52) U.S. Cl.
CPC ............ H04L 9/0852 (2013.01); B82Y 10/00
(2013.01); G06N 3/063 (2013.01); G06N 3/08
(2013.01);
(Continued)

(58) Field of Classification Search
CPC ... H04L 9/0852; H04L 2209/34; G06N 10/00;
G06N 20/00; G06N 3/063; G06N 3/08;
B82Y 10/00
See application file for complete search history.

(56) References Cited

U.S. PATENT DOCUMENTS 10,417,553 B2     9/2019  Adachi et al.
10,637,142 B1 *   4/2020  Tran ..................... H04W 16/02
(Continued)

FOREIGN PATENT DOCUMENTS

CN          106127300          11/2016

OTHER PUBLICATIONS

Nobuyuki et al., "quantum neuro-computing" system system A
informatics meeting magazine, Japan, Institute of Systems, Control
and Information Engineers, vol. 52, No. 5, May 15, 2008, 169-174.
(Continued)

*Primary Examiner* — Hosuk Song
(74) *Attorney, Agent, or Firm* — Fish & Richardson P.C.

(57)          ABSTRACT

A quantum neural network architecture. In one aspect, a
quantum neural network trained to perform a machine
learning task includes: an input quantum neural network
layer comprising (i) multiple qubits prepared in an initial
quantum state encoding a machine learning task data input,
and (ii) a target qubit; a sequence of intermediate quantum
neural network layers, each intermediate quantum neural
network layer comprising multiple quantum logic gates that
operate on the multiple qubits and target qubit; and an output
quantum neural network layer comprising a measurement
quantum gate that operates on the target qubit and provides
as output data representing a solution to the machine learn-
ing task.

20 Claims, 3 Drawing Sheets

Related U.S. Application Data continuation of application No. 16/618,713, filed as application No. PCT/US2018/035665 on Jun. 1, 2018, now Pat. No. 11,601,265.

(60) Provisional application No. 62/514,475, filed on Jun. 2, 2017.

(51) Int. Cl.

| | |
|---|---|
| *G06N 3/063* | (2023.01) |
| *G06N 3/08* | (2023.01) |
| *G06N 10/00* | (2022.01) |
| *G06N 10/60* | (2022.01) |
| *G06N 20/00* | (2019.01) |

(52) U.S. Cl.

CPC ............. *G06N 10/00* (2019.01); *G06N 10/60* (2022.01); *G06N 20/00* (2019.01); *H04L 2209/34* (2013.01)

(56) References Cited

U.S. PATENT DOCUMENTS

| | | | |
|---|---|---|---|
| 10,755,188 B2 | 8/2020 | Ashrafi et al. | |
| 11,152,925 B2 | 10/2021 | Debnath et al. | |
| 11,507,872 B2 | 11/2022 | Cao et al. | |
| 11,537,928 B2 | 12/2022 | Cao et al. | |
| 11,562,284 B1 | 1/2023 | Ryan et al. | |
| 11,568,293 B2 | 1/2023 | Linvill | |
| 11,593,707 B2 | 2/2023 | Romero et al. | |
| 11,601,265 B2 | 3/2023 | Neven et al. | |
| 11,829,877 B2 * | 11/2023 | Kerenidis | G06N 3/04 |
| 11,836,572 B2 * | 12/2023 | Bondesan | G06N 3/084 |
| 11,900,219 B1 * | 2/2024 | Ryan | G06N 10/20 |
| 11,924,334 B2 * | 3/2024 | Neven | G06N 20/00 |
| 11,960,972 B1 * | 4/2024 | Otterbach | G06F 15/16 |
| 11,989,162 B2 * | 5/2024 | Ganesh | G06N 10/20 |
| 12,001,918 B2 * | 6/2024 | Farhi | G06N 3/063 |
| 12,001,923 B2 * | 6/2024 | Tezak | G06N 20/10 |
| 12,165,004 B2 * | 12/2024 | Pichler | G06N 10/20 |
| 12,182,661 B2 * | 12/2024 | Rigetti | G06F 13/1663 |
| 12,204,991 B1 * | 1/2025 | Ryan | G06F 16/2379 |
| 2015/0317558 A1 | 11/2015 | Adachi et al. | |
| 2019/0220497 A1 | 7/2019 | Wiebe et al. | |
| 2020/0272930 A1 | 8/2020 | Aspuru-Guzik et al. | |
| 2021/0089955 A1 | 3/2021 | Bondesan et al. | |

OTHER PUBLICATIONS

Office Action in Japanese Appln. No. 2023-172891, mailed on Dec. 9, 2024, 6 pages (with English translation).

Notice of Allowance in Japanese Appln. No. 2023-172891, mailed on Apr. 1, 2025, 5 pages (with English translation).

Aaronson et al., "The Computational Complexity of Linear Optics" arXiv:1011.3245v1, Nov. 2010, 94 pages.

Aaronson, "Quantum Computing, Postselection, and Probabilistic Polynomial-Time", arXiv:quant-ph/0412187v1, Dec. 2004, 8 pages.

Aaronson, "Quantum Lower Bound for Recursive Fourier Sampling", arXiv:quant-ph/0209060v2, Dec. 2004, 8 pages.

Aasen et al., "Milestones Toward Majorana Based Quantum Computing", Physical Review, 2016, 6:031016, 28 pages.

Barends et al., "Logic gate at the surface code threshold: Superconducting qubits poised for fault-tolerant quantum computing", Nature, 2014, 508:500-503.

Boixo et al., "Characterizing Quantum Supremacy in Near Term Devices", arXiv:1608.00263v3, Apr. 2017, 23 pages.

Brassard et al., "Quantum Amplitude Amplification and Estimation", arXiv:quant-ph/0005055v1, May 2000, 32 pages.

Bremner et al., "Average case complexity versus approximate simulation of commuting quantum computations", arXiv:1504.07999v2, Sep. 2015, 10 pages.

Bremner et al., "Classical simulation of commuting quantum computations implies collapse of the polynomial hierarchy", Proceedings of the Royal Society, 2011, 467:459-472.

Corcoles et al., "Demonstration of a quantum error detection code using a square lattice for superconducting qubits", Nature Communications, Apr. 2015, 6(6979): 10 pages.

Da Silva et al., "Classical and Superposed Learning for Quantum Weightless Neural Networks", Neurocommuting, 2012, 75:52-60.

Debnath et al., "Demonstration of a small programmable quantum computer with atomic qubits", arXiv:1603.04512v3, Aug. 2016, 10 page.

Farhi et al., "A Quantum Approximate Optimization Algorithm" arXiv:1411.4028v1, Nov. 2014, 16 pages.

Farhi et al., "Quantum Algorithms for Fixed Qubit Architectures" arXiv1703.06199v1, Mar. 2017, 20 pages.

Farhi et al., "Quantum Computation by Adiabatic Evolution", arXiv:quant-ph/0001106v1, Jan. 2000, 24 pages.

Farhi et al., "Quantum Supremacy through the Quantum Approximate Optimization Algorithm" arXiv:1602.07674v2, Oct. 2019, 23 pages.

Fujii et al., "Commuting Quantum Circuits and Complexity of Ising Partition Functions", arXiv:1311.2128v2, Aug. 2016, 36 pages.

Goemans et al., "Improved Approximation Algorithms for Maximum Cut and Satisfiability Problems Using Semidefinite Programming", Journal of the ACM, 1995, 42(6):1115-1145.

Grover, "A Fast Quantum Mechanical Algorithm for Database Search", Proceedings of the 28th Annual ACM Symposium on Theory of Computing, 1996, 212-219.

Guerreschi et al., "Practical Optimization for hybrid quantum-classical algorithms", arXiv:1701.01450v1, Jan. 2017, 25 pages.

International Preliminary Report on Patentability in International Appln. No. PCT/US2018/035665, mailed on Dec. 12, 2019, 8 pages.

International Search Report and Written Opinion in International Appln. No. PCT/US2018/035665, mailed on Oct. 5, 2018, 14 pages.

Jozsa et al., "Classical simulation complexity of extended Clifford circuits", arXiv:1305.6190v1, May 2013, 17 pages.

Khot et al., "Optimal Inapproximability Results for MAX-CUT and Other 2-Variable CSPs?", SIAM Journal on Computing, 2007, 37(1):319-357.

Li et al., "Model and algorithm of quantum-inspired neural network with sequence input based on controlled rotation gates", Applied Intelligence, 2014, 40:107-126.

McClean et al., "Barren plateaus in quantum neural network training landscapes", Nature Communications, 2018, 9(4812): 1-6.

McClean et al., "The Theory of Variational Hybrid Quantum-Classical Algorithms", New Journal of Physics, 2016, 18:023023: 22 pages.

Mnih et al., "Human-level control through deep reinforcement learning", Nature, 518(7540):529-533.

Monz et al., "Realization of a scalable Shor algorithm", Science, 2016, 351:1068-1070.

Nelder et al., "A simplex method for function minimization", The Computer Journal, 1965, 7(4):308-313.

Notice of Allowance in Japanese Appln. No. 2021-078683, mailed on Sep. 4, 2023, 6 pages (with English translation).

Ofek et al., "Extending the lifetime of a quantum bit with error correction in superconducting circuits", Nature, 2016, 536:441-445.

Office Action in Australian Appln. No. 2018278348, mailed on Nov. 18, 2020, 4 pages.

Office Action in Chinese Appln. No. 201880036533.1, mailed on Nov. 1, 2022, 14 pages (with English Translation).

Office Action in Chinese Appln. No. 3,065,859, mailed on Mar. 17, 2021, 5 pages.

Office Action in European Appln. No. 18733461.0, mailed on Dec. 6, 2021, 11 pages.

Office Action in Japanese Appln. No. 2021-078683, mailed on Aug. 1, 2022, 6 pages (with English Translation).

Peruzzo et al., "A variational eigenvalue solver on a photonic quantum processor", Nature Communications, Jul. 2014, 5(4213): 7 pages.

Plagianakos et al., "Training Neural Networks with Threshold Activation Functions and Constrained Integer Weights" IEEE, 2000, 6 pages.

(56)  References Cited

OTHER PUBLICATIONS

Riste et al., "Detecting bit-flip errors in a logical qubit using stabilizer measurements", Nature Communications, 2015, 6(6983):6 pages.

Romero et al., "Quantum autoencoders for efficient compression of quantum data", arXiv, Feb. 2017, 10 pages.

Romero et al., "Strategies for quantum computing molecular energies using the unitary coupled cluster ansatz", arXiv:1701.02691v2, Feb. 2018, 18 pages.

Sete et al., "A Functional Architecture for Scalable Quantum Computing", IEEE International Conference on Rebooting Computing, 2016, 1-6.

Silver et al., "Mastering the game of Go with deep neural networks and tree search", Nature, 2016, 529(7587):484.

Svore et al., "Faster Phase Estimation", arXiv:1304.0741v1, Apr. 2013, 14 pages.

Terhal et al., "Adaptive Quantum Computation, Constant Depth Quantum Circuits and Arthur-Merlin Games", arXiv:quant-ph/0205133v6, Mar. 2004, 13 pages.

Wan et al., "Quantum generalisation of feedforward neural networks", npj Quantum Information, 2017, 3(1):1-8.

Wecker et al., "Progress towards practical quantum variational algorithms" arXiv:1507.08969v2, Sep. 8, 2015, 11 pages.

Yan et al., "The flux qubit revisited to enhance coherence and reproducibility", Nature Communications, 2016, 7:12964: 9 pages.

* cited by examiner

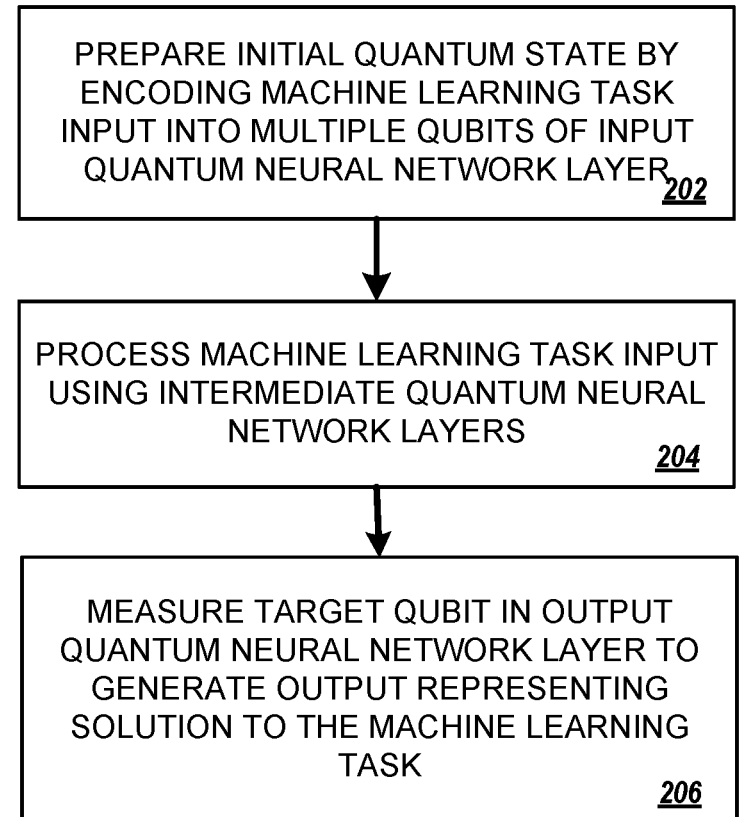

200

PREPARE INITIAL QUANTUM STATE BY ENCODING MACHINE LEARNING TASK INPUT INTO MULTIPLE QUBITS OF INPUT QUANTUM NEURAL NETWORK LAYER <u>202</u>

PROCESS MACHINE LEARNING TASK INPUT USING INTERMEDIATE QUANTUM NEURAL NETWORK LAYERS <u>204</u>

MEASURE TARGET QUBIT IN OUTPUT QUANTUM NEURAL NETWORK LAYER TO GENERATE OUTPUT REPRESENTING SOLUTION TO THE MACHINE LEARNING TASK <u>206</u>

*FIG. 3*

QUANTUM NEURAL NETWORK

CROSS-REFERENCE TO RELATED APPLICATION

This is a continuation application of, and claims priority to, U.S. patent application Ser. No. 18/117,232, filed on Mar. 3, 2023, which is a continuation of U.S. patent application Ser. No. 16/618,713, now U.S. Pat. No. 11,601,265, filed on Dec. 2, 2019, which application is a National Stage Application under 35 U.S.C. § 371 and claims the benefit of International Application No. PCT/US2018/035665, filed Jun. 1, 2018, which claims the benefit under 35 U.S.C. § 119(e) of priority to U.S. Application No. 62/514,475, filed Jun. 2, 2017, the disclosures of which are incorporated herein by reference.

BACKGROUND

This specification relates to neural network architectures and quantum computing.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a neural network architecture implemented by one or more quantum processors.

In general, one innovative aspect of the subject matter described in this specification can be embodied in a quantum neural network implemented by one or more quantum processors, the quantum neural network comprising: an input quantum neural network layer comprising (i) multiple qubits prepared in an initial quantum state and encoding a machine learning task data input, and (ii) a target qubit prepared in an initial state; a sequence of intermediate quantum neural network layers, each intermediate quantum neural network layer comprising multiple quantum logic gates that operate on the multiple qubits and target qubit; and an output quantum neural network layer comprising a measurement quantum gate that operates on the target qubit and provides, as output, data representing a solution to a machine learning task for which the quantum neural network has been trained to perform.

Other embodiments of this aspect include corresponding computer systems, apparatus, and computer programs recorded on one or more computer storage devices. A system of one or more classical or quantum computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions The foregoing and other embodiments can each optionally include one or more of the following features, alone or in combination. In some implementations the machine learning task comprises a binary classification task.

In some implementations the machine learning task data input comprises a Boolean function input $\{0, 1\}^n$ and the solution to the machine learning task comprises a Boolean function output $\{0, 1\}$.

In some implementations each intermediate quantum neural network layer comprises (i) single qubit quantum logic gates, (ii) two qubit quantum logic gates, or (iii) both single qubit and two qubit quantum logic gates.

In some implementations the single qubit quantum gates comprise single qubit gates of the form $\exp(-i\theta X_j)$.

In some implementations the two qubit quantum gates comprise two qubit gates of the form $\exp(i\theta Z_j Z_k)$.

In some implementations the sequence of intermediate quantum neural network layers maps the encoded machine learning task data input to an evolved state of the target qubit.

In some implementations mapping the encoded machine learning task data input to an evolved state of the target qubit comprises applying a unitary operator to the initial quantum states, the unitary operator being parameterized by quantum logic gate parameters for the quantum logic gates.

In some implementations preparing the multiple qubits in the initial state comprises setting a z-direction of each of the multiple qubits.

In some implementations the measurement quantum gate measures a y-direction of the target qubit.

In some implementations the quantum neural network replaces n top layers of a classical deep neural network trained to perform the machine learning task.

In some implementations the machine learning task data input comprises an output from the classical deep neural network.

In some implementations the multiple qubits and target qubit are arranged as a two dimensional grid with nearest neighbor interactions.

In general, another innovative aspect of the subject matter described in this specification can be embodied in a method for processing a data input using a quantum neural network that has been trained to perform a machine learning task, the method comprising: preparing, in an initial quantum state, multiple qubits of an input quantum neural network layer in an initial quantum state to encode machine learning task data input; processing the machine learning task data input using one or more intermediate quantum neural network layers, wherein each quantum neural network layer comprises multiple quantum logic gates that operate on the multiple qubits and a target qubit that is also in the input quantum neural network layer, the processing comprising, for each intermediate quantum neural network layer and in a sequence, applying quantum logic gates for the intermediate quantum neural network layer to a current quantum state representing the multiple qubits and the target qubit; and measuring the target qubit by a measurement quantum gate in an output quantum neural network layer to generate an output representing a solution to the machine learning task.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the machine learning task comprises a binary classification task.

In some implementations the machine learning task data input comprises a Boolean function input $\{0, 1\}^n$ and the solution to the machine learning task comprises a Boolean function output $\{0, 1\}$.

In some implementations each intermediate quantum neural network layer comprises (i) single qubit quantum logic gates, (ii) two qubit quantum logic gates, or (iii) both single qubit and two qubit quantum logic gates.

In some implementations the single qubit quantum gates comprise single qubit gates of the form $\exp(-i\theta X_j)$.

In some implementations the two qubit quantum gates comprise two qubit gates of the form $\exp(i\theta Z_j Z_k)$.

In some implementations processing the data input using the sequence of intermediate quantum neural network layers comprises mapping the encoded machine learning task data input to an evolved state of the target qubit.

In some implementations mapping the encoded machine learning task data input to the evolved state of the target qubit comprises applying a unitary operator to the initial quantum states, the unitary operator being parameterized by quantum logic gate parameters for the quantum logic gates.

In some implementations encoding the data input into an initial quantum state of the multiple qubits comprises setting a z-direction of each of the multiple qubits.

In some implementations measuring the target qubit to generate an output representing a solution to the machine learning task comprises measuring a y-direction of the target qubit.

In general, another innovative aspect of the subject matter described in this specification can be embodied in a method for training a quantum neural network, the method comprising: obtaining multiple training examples, each training example comprising a machine learning task input paired with a known classification for the machine learning task input; and training the quantum neural network on the training examples, comprising, for each training example: preparing, in an initial quantum state, multiple qubits of an input quantum neural network layer in an initial quantum state to encode the machine learning task input; processing the machine learning task input using one or more intermediate quantum neural network layers, wherein each quantum neural network layer comprises multiple quantum logic gates that operate on the multiple qubits and a target qubit that is also in the input quantum neural network layer, the processing comprising, for each intermediate quantum neural network layer and in a sequence, applying quantum logic gates for the intermediate quantum neural network layer to a current quantum state representing the multiple qubits and the target qubit; measuring the target qubit by a measurement quantum gate in an output quantum neural network layer to generate an output representing a solution to the machine learning task; and comparing the generated output to the known classification to determine one or more gate parameter adjustments; and adjusting values of the gate parameters from initial values to trained values.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations comparing the generated output to the known classification to determine one or more gate parameter adjustments comprises: calculating a loss function using the generated output and the known classification for the machine learning task; and performing gradient descent to determine adjusted values of the gate parameters.

In some implementations the method further comprises performing regularization after processing a subset of training examples.

In some implementations regularization comprises zero-norm or one-norm regularization.

In some implementations training the quantum neural network to perform the machine learning task comprises training the quantum neural network to learn a Boolean function $f: \{0, 1\}^n \rightarrow \{0, 1\}$.

In some implementations the loss function is given by $$\text{Loss}(s,\theta) = (\langle \psi(\theta, z_s) | \sigma_{y\,out} | \psi(\theta, z_s) \rangle - y_s)^2$$

where $\theta$ represents the quantum gate parameters, $\psi(\theta, z_s)$ represents an evolved quantum state of the multiple qubits and target qubit, $\sigma_{y\,out}$ represents the measurement quantum gate, and $y_s$ represents the known classification.

In some implementations the Boolean function comprises a parity function, subset parity function, subset majority function or logical AND function.

The subject matter described in this specification can be implemented in particular embodiments so as to realize one or more of the following advantages.

The presently described disclosure represents a significant and widely applicable improvement to the state of the art in classical and quantum neural networks.

A quantum neural network, as described in this specification, may perform machine learning tasks with lower time complexity compared to other known classical or quantum neural networks. For example, the quantum neural network described in this specification may be used to perform factoring tasks by casting the factoring tasks as decision tasks and performing the decision tasks using the quantum neural network. The time complexity may be lower since the difference between the number of neural network layers needed to perform the factorization using known neural networks and the presently described quantum neural network may increase exponentially with respect to the length of the number to be factored.

A quantum neural network, as described in this specification, may perform machine learning tasks with lower sample complexity compared to other known classical or quantum neural networks. For example the presently described quantum neural network may learn machine learning tasks with polynomial sample complexity, compared to other neural networks that learn the same machine learning tasks with exponential sample complexity.

A quantum neural network, as described in this specification, may also achieve higher expressivity (the measure of how the structural properties of a neural network affect the functions it is able to compute) compared to other known classical or quantum neural networks. For example, the Vapnik Chernovenkis dimension may be larger for the presently described quantum neural network compared to other neural networks, e.g., convolutional neural networks.

A quantum neural network, as described in this specification, may achieve higher robustness to label noise compared to other known classical or quantum neural networks. For example, the presently described quantum neural network may achieve higher robustness to label noise when learning parity tasks.

Due to the specific architecture of the presently described quantum neural network, the quantum neural network described in this specification may be trained to perform machine learning tasks without the use of backpropagation techniques. This can streamline the training process and reduce the processing time and costs needed to train the quantum neural network. For example, notorious downsides to the use of backpropagation techniques, e.g., the incurrence of practical instabilities in the learning process due to vanishing and exploding gradients or the difficulties in parallelizing large neural networks due to the sequential nature of backpropagation, can be avoided.

A quantum neural network, as described in this specification, may be combined with classical neural networks. Replacing layers of a classical neural network with the presently described quantum neural network may improve the accuracy and time in which the neural network can be trained and used at inference, i.e., compared to using just a classical neural network. Conversely, performing some precomputations using a classical neural network to generate a processed input for the presently described quantum neural network can reduce the computational costs and resources required when training and using the quantum neural network, i.e., compared to using just a quantum neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flow diagram of an example process for processing a data input using a quantum neural network that has been trained to perform a machine learning task.

Like reference numbers and designations in the various drawings indicate like elements.

DETAILED DESCRIPTION

This specification describes a neural network architecture implemented by one or more quantum processors. The neural network, hereafter called a quantum neural network (QNN), can be trained to perform a machine learning task, e.g., a binary classification task. For example, the QNN may be trained to learn a Boolean function $f: \{0, 1\}^n \rightarrow \{0, 1\}$, e.g., a parity function, subset parity function, or subset majority function. In these examples the machine learning task data input includes a Boolean function input $\{0, 1\}^n$. The solution to the machine learning task includes a Boolean function output $\{0, 1\}$.

Example Hardware

Figure 1:
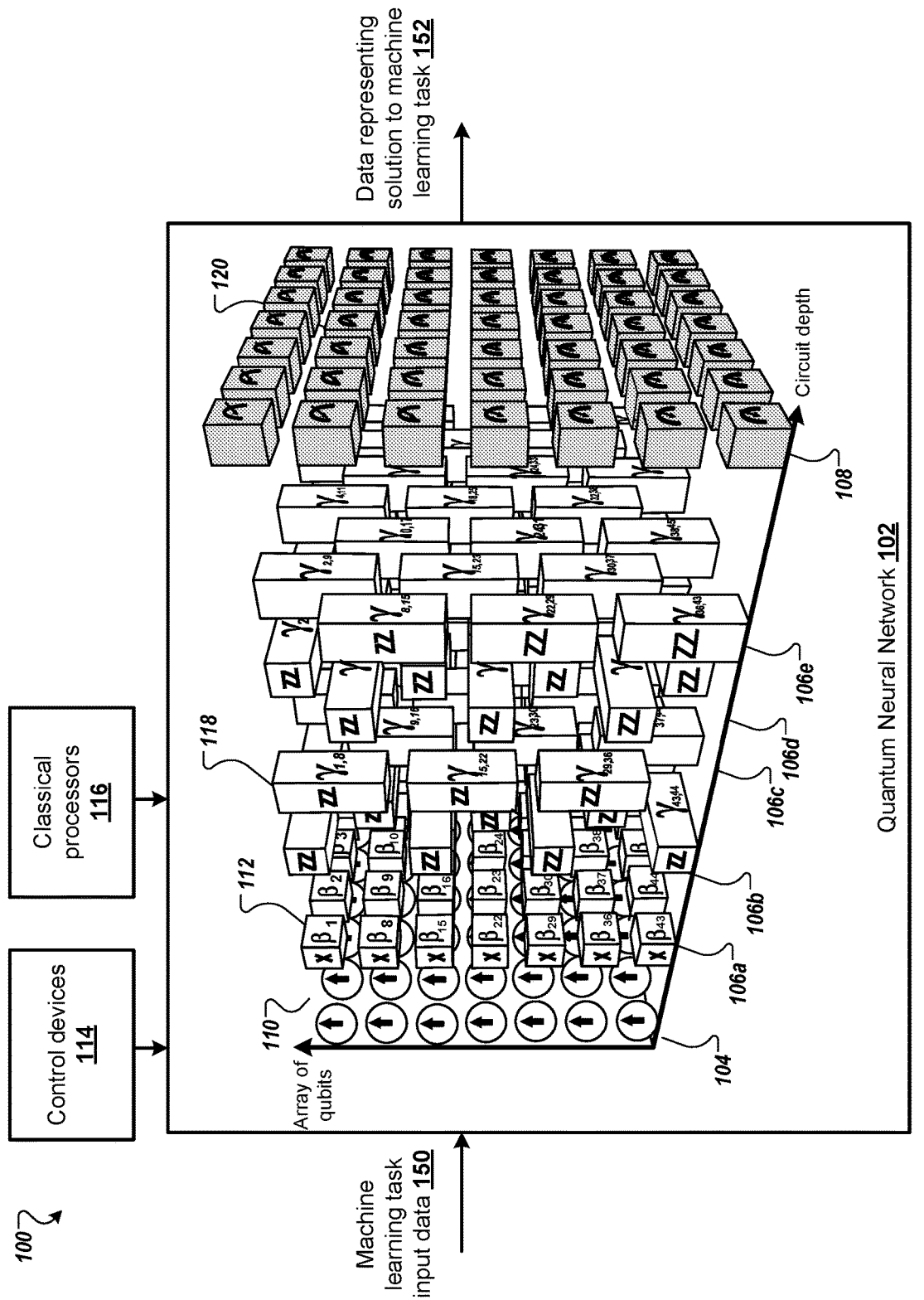
FIG. 1 is a block diagram of an example quantum neural network architecture.

FIG. 1 shows an example quantum neural network architecture 100 for performing machine learning tasks. The quantum neural network architecture 100 is an example is an example of a system implemented as classical or quantum computer programs on one or more classical computers or quantum computing devices in one or more locations, in which the systems, components, and techniques described below can be implemented.

The quantum neural network architecture 100 includes a quantum neural network 102. The quantum neural network 102 is configured to receive as input machine learning task input data, e.g., input data 150, and to process the received input data to generate as output data representing a solution to the machine learning task, e.g., output data 152. Data inputs can be received during training or when performing machine learning tasks, i.e., the data inputs may represent training examples or runtime inputs. For example, the quantum neural network 102 may receive data inputs from a set of training data during training, or may receive data inputs from a user device during an inferential machine learning process. An example process for training a quantum neural network is described in detail below with reference to FIG. 2. An example inferential machine learning process is described in detail below with reference to FIG. 3.

The quantum neural network 102 includes an input quantum neural network layer 104, a sequence of intermediate quantum neural network layers 106a-106e, and an output quantum neural network layer 108. For convenience, the example quantum neural network 102 is illustrated as including five intermediate quantum neural network layers 106a-106e, however in some implementations the quantum neural network may include fewer or more layers. The number of layers may depend on the complexity of the machine learning task that the quantum neural network is trained to perform and/or the target accuracy of solutions generated by the quantum neural network.

The input quantum neural network layer 104 includes a plurality of qubits 110, e.g., arranged as a two-dimensional grid with nearest neighbor interactions. The type of physical realizations of qubits included in the input quantum neural network layer may vary. For example, in some implementations the input quantum neural network layer 104 may include superconducting qubits, e.g., superconducting charge qubits, superconducting flux qubits or superconducting phase qubits. In other implementations the input quantum neural network layer 104 may include qubits realized by spins, e.g., electron spins, nuclear spins or atomic spins.

The plurality of qubits 110 includes multiple qubits that are prepared in an initial quantum state that encoded the machine learning task data input 150. For example, one or more control devices 114 may encode a machine learning task data input into an initial quantum state of the multiple qubits by setting the z-directions of each of the qubits. For example, in cases where the data input includes a binary string of length n, the system may set the z directions of n qubits corresponding to each binary digit to zero or one, wherein zero identifies with a zero computational basis state $|0\rangle$ and one identifies with a one computational basis state $|1\rangle$. The plurality of qubits also includes a target qubit that is prepared in an initial state, e.g., an arbitrary superposition state.

Each of the intermediate quantum neural network layers 106a-106e includes multiple quantum logic gates that operate on the plurality of qubits 110 (i.e., the multiple qubits prepared in the initial state encoding the machine learning task data input and the target qubit.) The quantum logic gates included in each intermediate quantum neural network layer may include single qubit quantum logic gates, two qubit quantum logic gates, or both single qubit and two qubit quantum logic gates. For example, in the example quantum neural network 100 the first intermediate quantum neural network layer 106a includes multiple single qubit gates, e.g., single qubit gate 112, that operate on each of the plurality of qubits 110. The subsequent intermediate quantum neural network layers 106b-108e include two qubit gates, e.g., two qubit gate 118. In some implementations the single qubit quantum gates may include single qubit gates of the form $\exp(-i\theta_j X_j)$ where $\theta_j$ represents gate parameters and $X_j$ represents a Pauli X operator. In some implementations the two qubit quantum gates may include two qubit gates of the form $\exp(i\theta Z_j Z_k)$, where Z represents a Pauli Z operator, or any other product of two Pauli operators.

The sequence of intermediate quantum neural network layers 106a-106e operate on the plurality of qubits 110, evolving a quantum state describing the plurality of qubits 110 to an evolved quantum state. The evolved quantum state encodes the solution to the machine learning task. More specifically, the sequence of quantum neural network layers 104, 106a-106e map the initial quantum state encoding the machine learning task data input 150 to an evolved state of the target qubit encoding the solution to the machine learning task.

The output quantum neural network layer 108 that includes multiple measurement quantum gates, e.g., measurement gate 120, that operates on the target qubit and provides as output a measurement result representing a solution to the machine learning task. For example, the measurement quantum gate 120 may be a gate that measures a y-direction of the target qubit to obtain the solution to the machine learning task. The location of the target qubit may vary, and FIG. 1 shows one of multiple possible locations.

The quantum neural network architecture 100 may include one or more control devices 114 and one or more classical processors 116. The control devices 114 include devices that are configured to operate on the quantum neural network 102 and the components therein. For example, the control devices 110 may include hardware used for initializing the plurality of qubits, e.g., control lines coupled to the plurality of qubits that run excitation pulses that allow the state of the qubits to be controlled. The control devices 110 may further include hardware used for controlling the quantum logic gates that are applied to the plurality of qubits, e.g., hardware used to set or adjust the values of the quantum logic gate parameters. In some implementations the control devices may include microwave control devices.

The classical processors 116 may be configured to perform classical operations. For example, the classical processors 116 may perform pre-processing of input data or post-processing of output data. For example, the classical processors 116 may receive output data representing a solution to a machine learning task from the quantum neural network 102 and process the received data to generate a data output that can be provided for display to an operator of the system 100.

In some implementations the quantum neural network 100 may be used in conjunction with a classical deep neural network implemented by the classical processors 116. For example, the quantum neural network 100 may replace a top (final) n layers of a classical deep neural network that has been trained to perform the machine learning task. In these examples, the machine learning task data input received by the quantum neural network includes an output from a (new) top layer in the classical deep neural network.

Programming the Hardware

Figure 2:
FIG. 2 is a flow diagram of an example process for training a quantum neural network.
Figure 2:
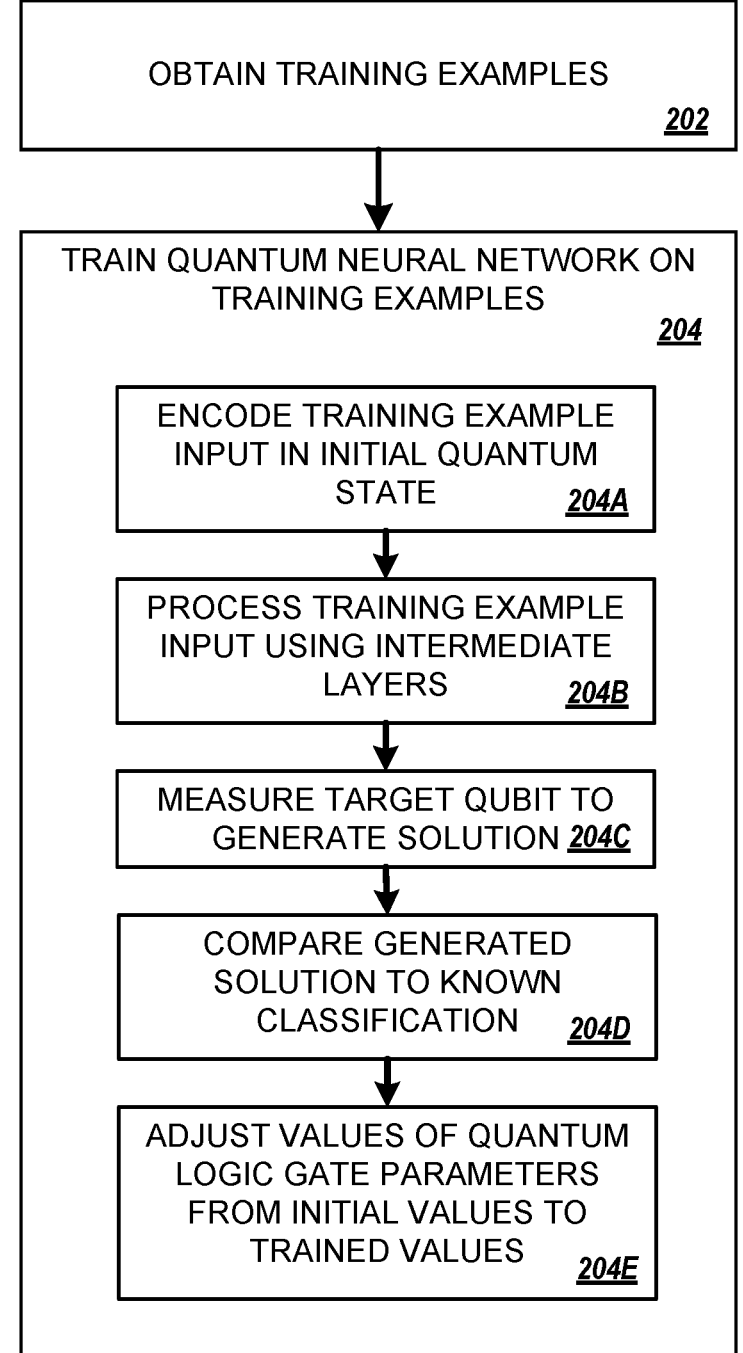

FIG. 2 is a flow diagram of an example process 200 for training a quantum neural network to perform a classification task. For example, the example process may be used to train the quantum neural network 100 described above with reference to FIG. 1. For convenience, the process 200 will be described as being performed by a system of one or more classical and/or quantum computers located in one or more locations.

The system obtains multiple training examples, each training example including a machine learning task input paired with a known classification for the machine learning task input (step 202). For example, in cases where the quantum neural network is trained to learn a Boolean function, the training examples may include $\{z_s, y_s = f(z_s)\}_{s=1}$ ... s, where $z_s$ represents the machine learning task input and $y_s$ represents the known classification for the input.

The system trains the quantum neural network on the training examples to adjust the values of the gate parameters from initial values to trained values (step 204). To train the quantum neural network on a training example the system prepares multiple qubits of an input quantum neural network layer in an initial quantum state to encode the machine learning task input in the initial quantum state (step 204a). The system then processes the machine learning task input using one or more intermediate quantum neural network layers (step 204b). Each quantum neural network layer includes multiple quantum logic gates that operate on the multiple qubits and a target qubit that is also in the input quantum neural network layer. Processing the machine learning task input using one or more intermediate quantum neural network layers may therefore include, for each intermediate quantum neural network layer and in a sequence, applying quantum logic gates for the intermediate quantum neural network layer to a current quantum state representing the multiple qubits and the target qubit. The system then measures the target qubit by applying a measurement quantum gate to the target qubit in an output quantum neural network layer to generate an output representing a solution to the machine learning task (step 204c).

The system compares the generated output to the known classification to determine one or more gate parameter adjustments (step 204d). Comparing the generated output to the known classification may include calculating functions, e.g., loss functions, using the generated output and the known classification. The functions can depend on the evolved quantum state of the multiple qubits and target qubit which, in turn, depends on the quantum gate parameters of the single and two qubit quantum logic gates included in the one or more intermediate quantum neural network layers. For example, in cases where the quantum neural network is trained to learn a Boolean function $f: \{0, 1\}^n \rightarrow \{0, 1\}$, e.g., a parity function, subset parity function, subset majority function or logical AND function, a loss function may be given by $$\text{Loss } (s, \theta) = (\langle \psi(\theta, z_s) | \sigma_{y \, out} | \psi(\theta, z_s) \rangle - y_s)^2$$

where $\theta$ represents the quantum gate parameters, $\psi(\theta, z_s)$ represents an evolved quantum state of the multiple qubits and target qubit, $\sigma_{y \, out}$ represents the measurement quantum gate, and $y_s$ represents the known classification. Gradient descent, e.g., stochastic gradient descent, may then be performed on the loss function to determine adjusted values of the gate parameters.

Due to the particular architecture of the quantum neural network, backpropagation techniques are not required to determine the one or more parameter adjustments. This is because by construction of the input quantum neural network layer, intermediate quantum neural network layers, and output quantum neural network layer, and functions of the evolved quantum state that are used to compare the generated output to the known classification, are dependent on the quantum logic gate parameters for quantum logic gates included in the intermediate quantum neural network layers—not just the quantum logic gate parameters included in the output quantum neural network layer. In other words, unlike conventional neural networks, the action of applying multiple intermediate quantum neural network layers to an input quantum neural network layer output is equivalent to evolving the initial state of qubits included in the input quantum neural network layer under a sequence of unitary operators that is parameterized by the quantum logic gate parameters for the quantum logic gates included in the multiple intermediate quantum neural network layers. By contrast, conventional neural networks can be thought of as highly nested functions of their parameters. The evolved initial state is therefore dependent on all the quantum logic gate parameters. Therefore, only one gradient descent or other optimization routine needs to be performed to determine parameter adjustments for all the quantum logic gate parameters (i.e., parameter adjustments for all the intermediate quantum neural network layers) when performing an optimization on functions of the evolved quantum state.

The system then adjusts values of the gate parameters from initial values to trained values (step 204e).

In some implementations the system may perform regularization techniques after processing a subset of the training examples, e.g., after processing 100 training examples. Regularization techniques include zero-norm or one-norm regularization. For example, after processing a subset of training examples, the quantum gate parameters θ may be monitored to determine whether any parameters are close to zero. If a parameter is close to zero, the gate may be adjusted, e.g., by replacing a Z gate with a Y gate, so that learning can be recycled.

FIG. 3 is a flow diagram of an example process 300 for processing a data input using a quantum neural network that has been trained to perform a machine learning task. For example, the example process 300 may be used for processing a data input using the quantum neural network 100 of FIG. 1 that has been trained to perform a machine learning task using the process 200 of FIG. 2. For convenience, the process 300 will be described as being performed by a system of one or more classical and/or quantum computers located in one or more locations.

The system prepares multiple qubits of an input quantum neural network layer in an initial quantum state to encode the data input into the initial quantum state (step 302). For example, the system may encode the data input into the initial quantum state by setting a z-direction of each of the multiple qubits of the input quantum neural network layer. Preparing the multiple qubits of the input quantum neural network layer also includes preparing a target qubit included in the input quantum neural network layer in an initial state, e.g., in a $1/\sqrt{2}(|0\rangle+|1\rangle)$ superposition state.

The system processes the data input using one or more intermediate quantum neural network layers that each include multiple quantum logic gates that operate on the multiple qubits and the target qubit (step 304). Each intermediate quantum neural network layer includes single qubit quantum logic gates, e.g., single qubit gates of the form $\exp(-i\theta X_j)$, two qubit quantum logic gates, e.g., two qubit gates of the form $\exp(i\theta Z_j Z_k)$, or both single qubit and two qubit quantum logic gates, that operate on the qubits included in the intermediate quantum neural network layers. Processing the data input using the one or more intermediate quantum neural network layers therefore includes, for each intermediate quantum neural network layer and in sequence, applying quantum logic gates for the intermediate quantum neural network layer to a current quantum state representing the multiple qubits and the target qubit.

Processing the data input using the one or more intermediate quantum neural network layers in this manner maps the encoded data input to an evolved state of the target qubit. That is, the encoded data input is mapped to an evolved state of the target qubit through application of a unitary operator to the initial quantum state. The unitary operator is parameterized by the single and two qubit quantum logic gate parameters for quantum logic gates included in the intermediate quantum neural network layers.

The system measures the target qubit to generate an output representing a solution to the machine learning task (step 306). For example, in cases where the machine learning task is a binary classification task and the data input encoded into the initial quantum state at step 302 is a Boolean function input $\{0, 1\}^n$, the generated output representing a solution to the machine learning task may include a Boolean function output $\{0, 1\}$. Measuring the target qubit may include measuring a y-direction of the target qubit.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semi-conductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A quantum neural network system implemented by one or more quantum processors, the quantum neural network comprising:

an input quantum neural network layer comprising a plurality of qubits prepared in an initial quantum state and encoding a machine learning task data input;

a sequence of intermediate quantum neural network layers, each intermediate quantum neural network layer comprising multiple parameterized quantum logic gates that operate on the plurality of qubits, wherein values of parameters of the multiple parameterized quantum logic gates are determined during training using a loss function; and an output quantum neural network layer comprising multiple measurement quantum gates, wherein the output quantum neural network layer provides as output a measurement result that represents a solution to the machine learning task;

wherein the machine learning task comprises a binary classification task; and wherein the machine learning task data input comprises a Boolean function input $\{0, 1\}^n$ and the solution to the machine learning task comprises a Boolean function output $\{0, 1\}$.

2. The quantum neural network system of claim 1, wherein the multiple parameterized quantum logic gates comprise Y gates.

3. The quantum neural network system of claim 1, wherein the multiple parameterized quantum logic gates comprise single qubit gates of the form $\exp(-i\theta_j X_j)$, wherein j indexes the single qubit, $\theta_j$ represents parameters of the single qubit gate, and $X_j$ represents a Pauli X operator on qubit j.

4. The quantum neural network system of claim 1, wherein the multiple parameterized quantum logic gates comprise two qubit gates of the form $\exp(-i\theta Z_j Z_k)$, wherein $\theta$ represents parameters of the two qubit gate, $Z_j$ represents a Pauli Z operator on qubit j, and $Z_k$ represents a Pauli Z operator on qubit k.

5. The quantum neural network system of claim 1, wherein the loss function is given by $$\text{Loss}\ (s, \theta) = (\langle\psi(\theta, z_s)|\sigma_{y\ out}|\psi(\theta, z_s)\rangle - y_s)^2$$

where $\theta$ represents the parameters of the multiple quantum logic gates, $\psi(\theta, z_s)$ represents an evolved quantum state of the plurality of qubits, $\sigma_{y\ out}$ represents the measurement quantum gates, and $y_s$ represents a known binary classification for a corresponding Boolean function input.

6. The quantum neural network system of claim 1, wherein the sequence of intermediate quantum neural network layers evolve the initial quantum state under a sequence of unitary operators that is parameterized by the parameters of the multiple parameterized quantum logic gates.

7. A method for processing a data input using a quantum neural network that has been trained to perform a machine learning task, the method comprising:

preparing multiple qubits of an input quantum neural network layer in an initial quantum state to encode machine learning task data input;

processing the initial quantum state using one or more intermediate quantum neural network layers to generate an evolved quantum state, each intermediate quantum neural network layer comprising multiple parameterized quantum logic gates that operate on the multiple qubits, wherein values of parameters of the multiple parameterized quantum logic gates are determined during training using a loss function; and measuring the multiple qubits in the evolved quantum state using multiple measurement quantum gates in an output quantum neural network layer to generate an output that represents a solution to the machine learning task;

wherein the machine learning task comprises a binary classification task; and wherein the machine learning task data input comprises a Boolean function input $\{0, 1\}^n$ and the solution to the machine learning task comprises a Boolean function output $\{0, 1\}$.

8. The method of claim 7, wherein the multiple parameterized quantum logic gates comprise Y gates.

9. The method of claim 7, wherein processing the initial quantum state using the one or more intermediate quantum neural network layers comprises, for each intermediate quantum neural network layer and in a sequence, applying quantum logic gates in the intermediate quantum neural network layer to a current quantum state of the multiple qubits.

10. The method of claim 7, wherein the multiple parameterized quantum logic gates comprise single qubit gates of the form $\exp(-\theta_j X_j)$, wherein j indexes the single qubit, $\theta_j$ represents parameters of the single qubit gate, and $X_j$ represents a Pauli X operator on qubit j.

11. The method of claim 7, wherein the multiple parameterized quantum logic gates comprise two qubit gates of the form $\exp(-i\theta Z_j Z_k)$, wherein $\theta$ represents parameters of the two qubit gate, $Z_j$ represents a Pauli Z operator on qubit j, and $Z_k$ represents a Pauli Z operator on qubit k.

12. The method of claim 7, wherein the loss function is given by $$\text{Loss } (s, \theta) = (\langle \psi(\theta, z_s) | \sigma_{y\ out} | \psi(\theta, z_s) \rangle - y_s)^2$$

where $\theta$ represents the parameters of the multiple quantum logic gates, $\psi(\theta, z_s)$ represents an evolved quantum state of the multiple qubits, $\sigma_{y\ out}$ represents the measurement quantum gates, and $y_s$ represents a known binary classification for a corresponding Boolean function input.

13. The method of claim 7, wherein the intermediate quantum neural network layers evolve the initial quantum state under a sequence of unitary operators that is parameterized by the parameters of the multiple parameterized quantum logic gates.

14. A method for training a quantum neural network, the method comprising:

obtaining multiple training examples, each training example comprising a machine learning task input paired with a known classification for the machine learning task input; and training the quantum neural network on the training examples, comprising, for each training example:

preparing multiple qubits of an input quantum neural network layer in an initial quantum state to encode a machine learning task input included in the training example;

processing the initial quantum state using one or more intermediate quantum neural network layers, to generate an evolved quantum state, each intermediate quantum neural network layer comprising multiple parameterized quantum logic gates that operate on the multiple qubits;

measuring the multiple qubits in the evolved quantum state using multiple measurement quantum gates in an output quantum neural network layer to generate an output that represents a solution to the machine learning task;

using a loss function to compare the output to a known classification included in the training example and determine one or more adjustments to parameters of the multiple parameterized quantum logic gates; and adjusting values of the gate parameters from initial values to trained values.

15. The method of claim 14, wherein the multiple parameterized quantum logic gates comprise Y gates.

16. The method of claim 14, wherein the multiple parameterized quantum logic gates comprise single qubit gates of the form $\exp(-i\theta_j X_j)$, wherein j indexes the single qubit, $\theta_j$ represents parameters of the single qubit gate, and $X_j$ represents a Pauli X operator on qubit j.

17. The method of claim 14, wherein the multiple parameterized quantum logic gates comprise two qubit gates of the form $\exp(-i\theta Z_j Z_k)$, wherein $\theta$ represents parameters of the two qubit gate, $Z_j$ represents a Pauli Z operator on qubit j, and $Z_k$ represents a Pauli Z operator on qubit k.

18. The method of claim 14, wherein the loss function is given by $$\text{Loss } (s, \theta) = (\langle \psi(\theta, z_s) | \sigma_{y\ out} | \psi(\theta, z_s) \rangle - y_s)^2$$

where $\theta$ represents the parameters of the multiple quantum logic gates, $\psi(\theta, z_s)$ represents an evolved quantum state of the multiple qubits, $\sigma_{y\ out}$ our represents the measurement quantum gates, and $y_z$ represents a known binary classification for a corresponding Boolean function input.

19. The method of claim 14, wherein the intermediate quantum neural network layers evolve the initial quantum state under a sequence of unitary operators that is parameterized by the parameters of the multiple parameterized quantum logic gates.

20. The method of claim 14, wherein processing the initial quantum state using the one or more intermediate quantum neural network layers comprises, for each intermediate quantum neural network layer and in a sequence, applying quantum logic gates in the intermediate quantum neural network layer to a current quantum state of the multiple qubits.

* * * * *